United States Patent [19]

König et al.

[11] 4,267,303

[45] May 12, 1981

[54] PROCESS FOR THE PREPARATION OF POLYMERS WITH DIPHENOL CARBONATE END GROUPS

[75] Inventors: Klaus König, Leverkusen; Manfred Schreckenberg, Krefeld; Christian Lindner, Cologne; Carlhans Süling, Odenthal; Dieter Freitag, Krefeld-Traar, all of Fed. Rep. of Germany

[73] Assignee: Bayer Aktiengesellschaft, Leverkusen, Fed. Rep. of Germany

[21] Appl. No.: 70,072

[22] Filed: Aug. 27, 1979

[30] Foreign Application Priority Data

Aug. 28, 1978 [DE] Fed. Rep. of Germany ....... 2837526

[51] Int. Cl.$^3$ .................. C08G 63/62; C08G 63/64
[52] U.S. Cl. .................. 528/171; 260/463; 525/439; 528/173; 528/176; 528/179; 528/180; 528/181; 528/182; 528/199; 528/200; 525/462
[58] Field of Search ............. 528/171, 176, 197, 179, 528/180, 181, 182, 199, 200, 173; 260/463; 525/439

[56] References Cited

U.S. PATENT DOCUMENTS

| | | | |
|---|---|---|---|
| 3,030,335 | 4/1962 | Goldberg | 528/197 |
| 3,161,615 | 12/1964 | Goldberg | 528/197 |
| 3,287,442 | 11/1966 | Caldwell et al. | 528/197 |
| 3,290,409 | 12/1966 | Munro | 525/439 |
| 3,641,200 | 2/1972 | Matzner | 525/439 |
| 3,843,708 | 10/1974 | Matzner | 260/463 |
| 3,998,908 | 12/1976 | Lindenfels | |

FOREIGN PATENT DOCUMENTS

| | | | |
|---|---|---|---|
| 2619831 | 11/1977 | Fed. Rep. of Germany | 528/197 |
| 2636784 | 2/1978 | Fed. Rep. of Germany | 528/197 |
| 2,650,533 | 5/1978 | Fed. Rep. of Germany | 528/197 |
| 2651639 | 5/1978 | Fed. Rep. of Germany | 528/197 |

OTHER PUBLICATIONS

Merrill, J.P.S. vol. 55, *Block Copolymers Based on 2,2-bis-(4-hydroxyphenyl)-Propane Polycarbonate,* pp. 343–352, (1961).
Goldberg, J.P.S. Part C, No. 4, pp. 707–730, *Elastomeric Polycarbonate Block Copolymers,* 1963.

*Primary Examiner*—Lester L. Lee
*Attorney, Agent, or Firm*—Gene Harsh; Lawrence S. Pope; Aron Preis

[57] ABSTRACT

This disclosure is concerned with a single step process for the production of diphenol terminated polycarbonates by the transesterification of diphenols, bis-aryl carbonates and polymeric diols with aliphatically bound terminal hydroxyl groups. These diols are selected from polyesters, polyethers, polythioethers and polyacetals. The transesterification is carried out at elevated temperatures under vacuum optionally in the presence of a catalyst with the ratios of the reactants being such as to avoid the retention of any terminal aliphatic hydroxyl groups or aryl carbonate groups.

11 Claims, No Drawings

PROCESS FOR THE PREPARATION OF POLYMERS WITH DIPHENOL CARBONATE END GROUPS

BACKGROUND OF THE INVENTION

Of the three known processes for the preparation of aromatic polycarbonates, that is to say the transesterification process, the two-phase boundary process and the process in a homogeneous phase system (also called the pyridine process), only the latter can be used directly if, in addition to diphenols, diols, that is to say compounds with two aliphatic OH groups, in particular higher-

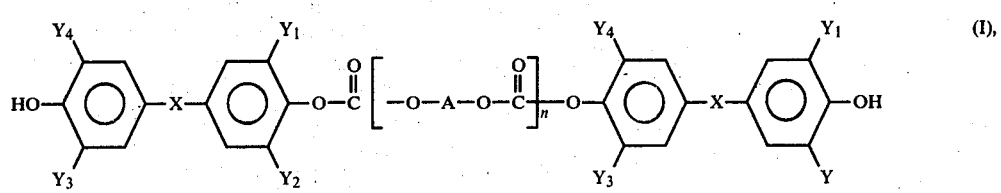

molecular diols, are also to be used to a very considerable extent for the preparation of the polycarbonates (see, for example, U.S. Pat. No. 3,161,615, U.S. Pat. No. 3,030,335, U.S. Pat. No. 3,287,442, Journal of Polymer Science, Part C, Polymer Symposia, No. 4 (1963), Part 1, pages 707–730, U.S. Pat. No. 3,641,200 and U.S. Pat. No. 3,843,708). In addition, the suspension process (see DT-OS (German Published Specification) No. 1,495,906 and U.S. Pat. No. 3,290,409), a modification of the process in a homogeneous phase system, can also be used directly.

In contrast, side reactions occur when the transesterification process is used, especially if polyester-diols are employed as the diols (see U.S. Pat. No. 3,161,615, column 5, lines 29–37, and U.S. Pat. No. 3,030,335, column 4, line 72–column 5, line 5).

The two-phase boundary process, in turn, requires prior conversion of the diols to be employed either into bis-chlorocarbonic acid esters (see U.S. Pat. No. 3,287,442, column 7, lines 32 et seq. and Journal of Polymer Science, Volumne 55 (1961), pages 343–352) or into diols with phenolic OH groups (see Journal of Polymer Science, Part C (1963), loc. cit. page 719).

The conversion last mentioned has hitherto been carried out successfully only as a two-stage process (see DT-OS (German Published Specification) No. 2,619,831 (LeA 16,933), DT-OS (German Published Specification) No. 2,636,784 (LeA 17,025), DT-OS (German Published Specification) No. 2,650,533 (LeA 17,516) and DT-OS (German Published Specification) No. 2,651,639 (LeA 17,535)).

SUMMARY OF THE INVENTION

The present invention relates to a process for the preparation of polymers with diphenol carbonate end groups, which is characterized in that polyester-diols, polyether-diols, polythioether-diols or polyacetal-diols with average molecular weights of $\overline{M}n$ (number average) about 300–6,000, preferably about 500–4,000, carbonic acid bis-aryl esters (for example, diphenyl carbonate) and diphenols (for example, bisphenol-A) are reacted together, catalysts also being used if appropriate, at temperatures between about 80° and 270° C. and under a vacuum of between about 200 mm Hg and 0.1 mm Hg, n mols of diol, m mols of diphenol and p mols of carbonic acid bis-aryl ester being employed for the preparation of 1 mol of the polymer with diphenol carbonate end groups, n being a number from 1 to 20 and being chosen in each case such that the product of n and the molecular weight $\overline{M}n$ (number average) increased by 26, of the diol employed is a number between 500 and 14,500, and m being any desired number between 2 and 5 and p being at least n+1, but at most (n+m)−1.

DETAILED DESCRIPTION OF THE INVENTION

The resulting polymers with diphenol carbonate end groups have, for example, the following ideal formula (I)

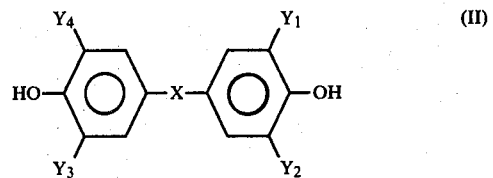

wherein

A is the bivalent radical of one of the diols which can be used according to the invention, and in which the end groups result from the diphenols of the formula (II)

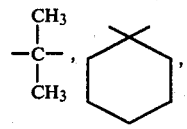

wherein

X denotes a single bond, —CH$_2$—,

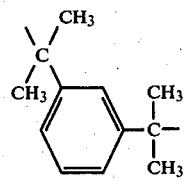

O, S, SO$_2$ or $Y_1$ to $Y_4$ are identical or different and denote hydrogen, $C_1$—$C_4$—alkyl, such as, for example, methyl, or halogen, such as, for example, chlorine or bromine, and n denotes a number from 1 to 20.

Suitable catalysts for the preparation, according to the invention, of the polymers with diphenol carbonate end groups are: (a) transition metal compounds, such as titanic acid tetraalkyl esters, dialkyl-tin dicarboxylates, tin dicarboxylates, chelates of Fe, Zn, Co, Ni or Pb and carboxylates of Pb, Co, Ni or Fe, and (b) bases, such as tertiary amines, or oxides, hydroxides, carbonates, alcoholates, phenolates or carboxylates of alkali metals or alkaline earth metals.

The catalyst is used in amounts between about 0.0001 to 1% by weight, preferably about 0.001 to 0.1% by weight, relative to the total weight of the reaction mixture employed.

The process according to the invention is characterized in that the polycondensation of aliphatic diols and aromatic diphenols with carbonic acid bis-aryl esters is carried out at about 80°–270° C., preferably at about 100°–220° C., and under a vacuum of between about 200 mm Hg and 0.1 mm Hg, until about 99.9% of the phenol liberated during the reaction has been distilled off. Residual amounts of phenol can then be blown out with an inert gas.

The process according to the invention for the preparation of the polymers with diphenol carbonate end groups is preferably carried out in the absence of solvents for the reactants, in particular in bulk.

The reaction time for the transesterification process for the preparation of the polymers with diphenol carbonate end groups is between about 2 and 60 hours, depending on the reaction temperature and on the nature and the amount of catalyst.

Surprisingly, random polycarbonate mixtures with aliphatic and aromatic OH groups are not formed in the conjoint condensation reaction, but selective condensation of the diol component which can be used according to the invention first takes place. The diphenol reacts only at the end of the reaction and is linked to the chain ends of the polycarbonate, so that the products according to the invention contain the OH excess of 2 mols, prescribed in the recipes, almost exclusively in the form of phenolic OH end groups.

The reaction of aliphatic hydroxy compounds and aromatic hydroxy compounds with carbonic acid esters is indeed known from British Pat. No. 885,442, but this reaction is the preparation of branched polycarbonates with the incorporation of polyhydroxy compounds with at least 3 hydroxyl groups.

Particularly suitable carbonic acid bis-aryl esters are those of the formula (III)

wherein
Ar is a substituted or unsubstituted aryl radical with 6 to 18 C atoms.

Possible substituents are, in particular, $C_1$—$C_4$—alkyl radicals, as well as nitro or halogen, such as, for example, chlorine or bromine. Examples of these compounds are diphenyl carbonate, alkyl-substituted diphenyl carbonates, such as di-toluyl carbonates, halogen-substituted diphenyl carbonates, such as di-chlorophenyl carbonates, dinaphthyl carbonate and alkyl-substituted and halogen-substituted dinaphthyl carbonates; in these compounds, the nitro, alkyl or halogen substituents on the two phenyl nuclei or on the two naphthyl nuclei of the diaryl carbonates can be identical or different and can be symmetrical or unsymmetrical relative to one another. Thus, for example, phenyl toluyl carbonate, phenyl chlorophenyl carbonate, 2-toluyl 4-toluyl carbonate or 4-toluyl 4-chlorophenyl carbonate are also suitable for the process.

Diphenols which are suitable for the preparation according to the invention of the polymers with diphenol carbonate end groups are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α′,α-bis-(hydroxyphenyl)-diisopropylbenzenes, and nuclear-alkylated and nuclear-halogenated compounds thereof. These and other suitable aromatic dihydroxy compounds are listed, for example, in U.S. Pat. Nos. 3,028,365, 2,999,835, 3,148,172, 3,271,368, 2,991,273, 3,217,367, 3,280,078, 3,014,891 and 2,999,846 and in German Offenlegungsschriften (German Published Specifications) Nos. 2,063,050 and 2,211,957.

Examples of suitable diphenols are bis-(4-hydroxyphenyl)-methane, 4,4′-dihydroxydiphenyl, 2,4-bis-(4-hydroxyphenyl)-2-methylbutane, α,α-bis-(4-hydroxyphenyl)-p-diisopropylbenzene, 2,2-bis-(3-chloro-4-hydroxyphenyl)-propane and 2,2-bis-(3,5-dimethyl-4-hydroxyphenyl)-propane.

Examples of preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl)sulphide.

Either one or more of the diphenols which are suitable according to the invention can be employed.

Examples of polyester-diols which are suitable according to the invention are reaction products of dihydric alcohols with dibasic carboxylic acids. Instead of the free polycarboxylic acids, it is also possible to use the corresponding polycarboxylic acid anhydrides or corresponding polycarboxylic acid esters of lower alcohols, or mixtures thereof, for the preparation of the polyester-polyols. The polycarboxylic acids can be aliphatic, cycloaliphatic, aromatic and/or heterocyclic in nature and can optionally be substituted, for example by halogen atoms, and/or unsaturated. Examples of these compounds which may be mentioned are: oxalic acid, malonic acid, succinic acid, adipic acid, azelaic acid, sebacic acid, phthalic acid, isophthalic acid, terephthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids, optionally as mixtures with monomeric fatty acids. Examples of possible dihydric alcohols, optionally as mixtures with one another, are ethylene glycol, propylene 1,2-glycol and 1,3-glycol, butylene 1,4-glycol and 2,3-glycol, hexane-1,6-diol, octane-1,8-diol, neopentylglycol, cyclohexanedimethanol (1,4-bis-hydroxymethyl-cyclohexane) and 2-methyl-1,3-propanediol, and furthermore thiodiglycol, diethylene glycol, triethylene glycol, tetraethylene glycol, polyethylene glycols, dipropylene glycol, polypropylene glycols, dibutylene glycol and polybutylene glycols.

The content of hydroxyl end groups and thus the "average" molecular weight $\overline{M}n$ are determined by choosing the defined excess of alcohol. Polyesters of aliphatic starting components are preferably employed.

Examples of polyesters containing hydroxyl groups, in the sense of the invention, are also those which are prepared by polymerization of a lactone, for example of ε-caprolactone, or by condensation of a hydroxycarboxylic acid, for example, of ω-hydroxycaproic acid, onto a starter containing hydroxyl group. The $\overline{M}n$ of this polyester can again be calculated as described above.

Examples of polyether-diols which are suitable according to the invention are those of the formula (IV)

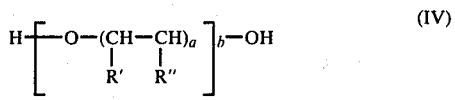

wherein

R' and R" independently of one another are H or $C_1$-$C_4$-alkyl, a is an integer from 1 to 6 and b is an integer from 3 to 140, in particular 3 to 90.

Examples of the compounds are poly-(ethylene oxide)-glycols, poly-(1,2-propylene oxide)-glycols, poly-(1,3-propylene oxide)-glycols, poly-(1,2-butylene oxide)-glycols, poly-(tetrahydrofurane)-glycols and the corresponding poly-(pentylene oxide)-glycols, poly-(hexamethylene oxide)-glycols, poly-(heptamethylene oxide)-glycols, poly-(octamethylene oxide)-glycols and poly-(nonamethylene oxide)-glycols, and copolymers or block copolymers of, for example, ethylene oxide and propylene oxide.

Examples of polythioether-diols which are suitable according to the invention are those which are prepared by acid condensation of thiodiglycol with itself or with other diols, such as, for example, hexane-1,6-diol, and which have molecular weights which can be regulated by known processes.

Examples of polyacetal-diols which are suitable according to the invention are those which are prepared by acid condensation of diols, such as, for example, diethylene glycol, triethylene glycol, butane-1,4-diol or hexane-1,6-diol, with aliphatic aldehydes, such as, for example, formaldehyde or acetaldehyde, and which have molecular weights which are regulated by known methods.

Examples of polymers according to the invention with diphenol carbonate end groups are thus those of the ideal formula (Ia-Ii)

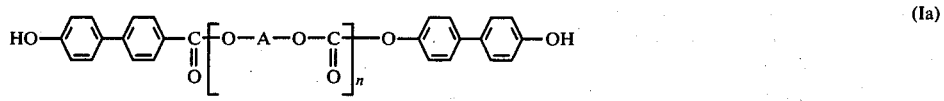

(Ia)

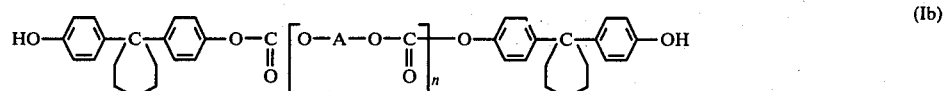

(Ib)

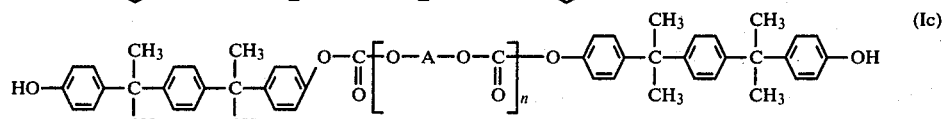

(Ic)

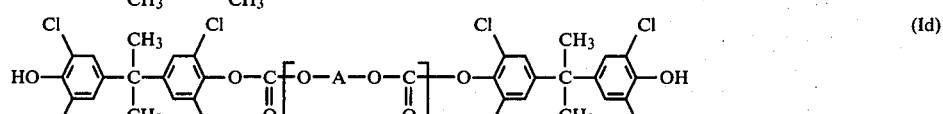

(Id)

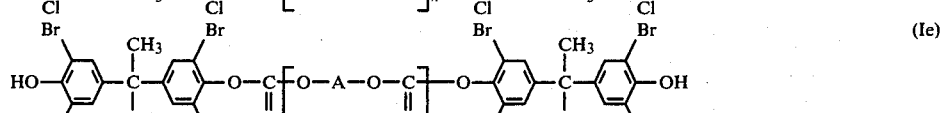

(Ie)

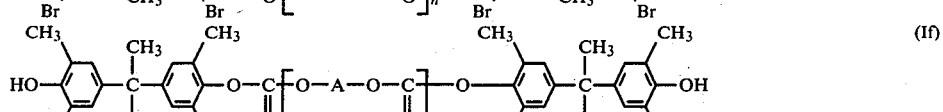

(If)

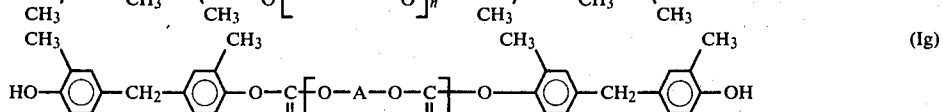

(Ig)

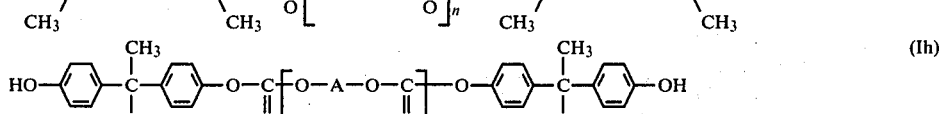

(Ih)

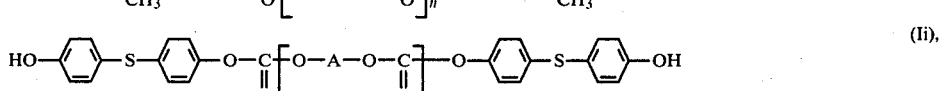

(Ii), wherein

A is the bivalent radical of the diols which are suitable according to the invention and n denotes a number from 1 to 20.

The polymers according to the invention with diphenol carbonate end groups are suitable as starting bisphenols for the preparation of polycarbonates by the known two-phase boundary condensation process. The known high-molecular aliphatic-aromatic polycarbonate elastomers, for example, are thus obtained.

The polymers with diphenol carbonate end groups which are obtained according to the invention from the polyether-diols are further processed, for example, according to DT-OS (German Published Specification) Nos. 2,636,784 (LeA 17,025) to give polyether-polycarbonates which can be processed as thermoplastics. The polymers with diphenol carbonate end groups which are obtained from the polyester-diols can correspondingly be further processed, for example according to DT-OS (German Published Specification) No. 2,651,639 (LeA 17,535) to give polyester-polycarbonates. Corresponding statements apply to the polymers with diphenol carbonate end groups which are obtained from the polythioether-diols and the polyacetal-diols. As is known, these plastic, segmented polycarbonates which are elastic to a greater or lesser extent can be used industrially, for example, as sealing material, as insulating material in electro-technology and as a starting material for tubing.

Further processing and industrial use of the polymers, obtained according to the invention, with diphenol carbonate end groups can also be effected, for example, according to U.S. Pat. No. 3,030,335, U.S. Pat. No. 3,287,442 and U.S. Pat. No. 3,641,200.

The average molecular weights listed in the examples which follow and in the above description are number average $\overline{M}n$ and are established by determining the OH number.

The OH number of the polymers with diphenol carbonate end groups is determined by acylation with acetic anhydride in pyridine and back-titration of the acetic acid formed and of the excess of anhydride with NaOH. Both aliphatic and phenolic hydroxyl groups are thereby recorded. If phthalic anhydride is used instead of acetic anhydride, only aliphatic hydroxyl groups are acylated under the analysis conditions. The difference between the two analyses gives the content of phenolic OH groups.

EXAMPLES

EXAMPLE 1

Preparation of a polyester of hexanediol and adipic acid with diphenol carbonate end groups of 2,2-bis-(4-hydroxyphenyl)-propane (bisphenol A) ($\overline{M}n = 3,170$)

1 molar batch:

A 10 l three-necked flask, provided with a stirrer, contact thermometer, packed column (diameter: 8 cm, height: 80 cm), distillation bridge heated to 45° C. and 2 l receiver is charged with 2,250 g (1 mol) of a polyester of hexanediol and adipic acid with an OH number of 49.9 ($\overline{M}n = 2,250$), 684 g (3 mols) of 2,2-bis-(4-hydroxyphenyl)-propane and 642 g (3 mols) of diphenyl carbonate. After the mixture has melted at 100° C., 20 mg of NaOH are stirred in as a catalyst. A vacuum of 0.7 mm Hg is now applied and a condensation reaction is carried out at 170°–200° C. in the course of 4.5 hours, 562 g (calculated: 564 g) of phenol being distilled off, to give a wax which melts at 48° C. and has an OH number of 35.3 (calculated: 37.2), determined by the acetic anhydride method.

EXAMPLE 2

Preparation of a polypropylene ether with diphenol carbonate end groups of 2,2-bis-(4-hydroxyphenyl)-propane ($\overline{M}n = 1,370$)

2 molar batch:

4,000 g (2 mols) of a polypropylene glycol polyether started from 1,2-propylene glycol and with an average molecular weight ($\overline{M}n = 2,000$) and 1,368 g (6 mols) of 2,2-bis-(4-hydroxyphenyl)-propane are subjected to a conjoint condensation reaction, as in Example 1, with 856 g (4 mols) of diphenyl carbonate and 20 mg of KOH as a catalyst.

A viscous, pale yellow oil with a phenolic OH number of 82 is obtained.

EXAMPLE 3

Preparation of a thioether with diphenol carbonate end groups of 2,2-bis-(4-hydroxyphenyl)-propane ($\overline{M}n = 1,370$) 5 molar batch:

4,125 g (5 mols) of a polythioether prepared by customary methods by condensation of hexanediol and thiodiglycol in the molar ratio 1:1 and with a $\overline{M}n = 825$ are subjected to a conjoint condensation reaction, as in Example 1, with 2,280 g (10 mols) of bisphenol A and 2,140 g (10 mols) of diphenyl carbonate using 1 g of titanic acid tetrabutyl ester. A medium-viscosity liquid is obtained which has an OH number of 82, determined by the acetic anhydride method.

EXAMPLE 4

Preparation of a polyacetal with diphenol carbonate end groups of 2,2-bis-(4-hydroxyphenyl)-propane ($\overline{M}n = 3,270$) 2 molar batch:

5,200 g (4 mols) of a polyacetal ($\overline{M}n = 1,300$), which has been prepared by condensation, which is known from the literature, of hexanediol with paraformaldehyde are subjected to a conjoint condensation reaction, as described in Example 1, with 912 g (4 mols) of bisphenol A and 1,284 g (6 mols) of diphenyl carbonate. A high-viscosity liquid with an OH number of 34.3 (acetic anhydride method) is obtained.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polymer with diphenol carbonate end groups, characterized in that (a) a diol selected from polyester-diols, and polyacetal-diols with average molecular weights of $\overline{M}n$ (number average) 300–6,000, (b) a carbonic acid bis-aryl ester and (c) a diphenol are reacted together, a catalyst also being used if appropriate, at a temperature between 80° and 270° C. and under a vacuum of between 200 mg Hg and 0.1 mm Hg, n mols of diol, m mols of diphenol and p mols of carbonic acid bis-aryl ester being employed for the preparation of 1 mol of the polymer with diphenol carbonate end groups, n being a number from 1 to 20 and being chosen in each case such that the product of n and the molecular weight $\overline{M}n$ (number average), increased by 26, of the diol employed is a number between 500 and 14,500, and m being any desired number between 2 and 5 and p being at least n+1, but at most (n+m)−1.

2. The process of claim 1, wherein the starting diol (a) is selected from those with average molecular weights of $\overline{M}n$ (number average) about 500–4,000.

3. A process according to claim 1 or 2, characterized in that the diol (a) is selected from (i) polyester-diols formed by the reaction of a dihydric alcohol and a dibasic carboxylic acid (or an anhydride or lower alkyl ester thereof), or by the polymerization of a lactone or by the condensation of a hydroxycarboxylic acid with a starter compound containing hydroxyl groups, and (ii) polyacetal-diols formed by the acid condensation of a diol with an aliphatic aldehyde.

4. A process according to claim 3, characterized in that the carbonic acid bis-aryl ester (b) has the general formula $$Ar-O-\underset{\underset{O}{\|}}{C}-O-Ar \qquad (III)$$

in which Ar is an aryl radical with 6–18 carbon atoms, which is optionally substituted by $C_1$–$C_4$ alkyl, nitro or halogen, the substituents being selected independently of one another and the Ar radicals optionally differing in their substituents.

5. The process of claim 4, characterized in that the diphenol (c) has the general formula

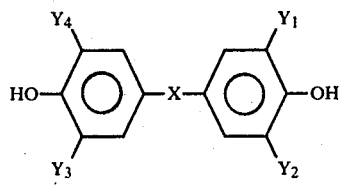

in which X denotes a single bond, —$CH_2$—, —$C(CH_3)_2$—

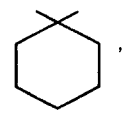

—O—, —S—, —$SO_2$—or, and

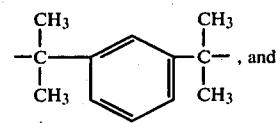

$Y_1$ to $Y_4$ each denotes, independently of the others, hydrogen, $C_1$—$C_4$—alkyl or halogen.

6. The process of claim 1, wherein the reaction is effected in the presence, as a catalyst, of a transition metal compound or a base.

7. The process of claim 6, wherein the catalyst is a titanic acid tetraalkyl ester, a dialkyl-tin carboxylate, a tin dicarboxylate, a chelate of Fe, Zn, Co, Ni or Pb, a carboxylate of Pb, Co, Ni or Fe, a tertiary amine or an oxide, hydroxide, carbonate, alcoholate, phenolate or carboxylate of an alkali metal or an alkaline earth metal.

8. The process of claim 1, wherein a catalyst is present in an amount of about 0.0001 to 1% by weight of the total reaction mixture.

9. The process of claim 8, wherein a catalyst is present in an amount of about 0.001 to 0.1% by weight of the total reaction mixture.

10. The process of claim 1, wherein the reaction is effected at from about 100° to 220° C.

11. The process of claim 1, wherein the reaction is effected in the absence of a solvent.

* * * * *